(12) United States Patent
Karch

(10) Patent No.: US 6,556,985 B1
(45) Date of Patent: Apr. 29, 2003

(54) RULE CONSTRUCTION AND APPLICATION

(75) Inventor: Robert Karch, Westfield, NJ (US)

(73) Assignee: Teleran Technologies, Inc., Roseland, NJ (US)

( * ) Notice: Subject to any disclaimer, the term of this patent is extended or adjusted under 35 U.S.C. 154(b) by 0 days.

(21) Appl. No.: 09/361,028

(22) Filed: Jul. 23, 1999

(51) Int. Cl.[7] .............................................. G06F 17/30
(52) U.S. Cl. .............................. 707/2; 707/102; 706/46
(58) Field of Search ............................. 707/2, 100–102; 706/10–13, 50–52, 54, 75–77, 45, 55, 61, 46, 47

(56) References Cited

U.S. PATENT DOCUMENTS

| | | | | |
|---|---|---|---|---|
| 5,487,135 A | * | 1/1996 | Freeman | 706/59 |
| 5,649,066 A | * | 7/1997 | Lacher et al. | 706/25 |
| 5,692,107 A | * | 11/1997 | Simoudis et al. | 706/50 |
| 5,765,028 A | * | 6/1998 | Gladden | 706/11 |
| 5,802,255 A | * | 9/1998 | Hughes et al. | 706/11 |
| 5,809,492 A | * | 9/1998 | Murray et al. | 706/45 |
| 5,826,250 A | * | 10/1998 | Trefler | 706/50 |
| 5,899,985 A | * | 5/1999 | Tanaka | 706/45 |
| 5,899,991 A | * | 5/1999 | Karch | 707/1 |
| 5,940,815 A | * | 8/1999 | Maeda et al. | 706/12 |

* cited by examiner

Primary Examiner—Hosain T. Alam
(74) Attorney, Agent, or Firm—Kaplan & Gilman, LLP

(57) ABSTRACT

A rule construction and application technique is disclosed wherein atomic rules are used alone or in combination with template rules in order to construct complex rules. The complex rules may be stored and/or applied to objects, and may also be used to generate further rules. A domain agent is disclosed that acts to operate between the object and the rule.

9 Claims, 3 Drawing Sheets

FIG. 3

BNF grammar definition of the SQL

BNF grammar definition of the SQL statement.

SQL statement: `SELECT salary / 2 FROM empinfo`

Breaks down into the following structure:

```
DOMAIN: sql.SqlBatchInfo
 DOMAIN: sql.CompilationUnit
  DOMAIN: sql.TopLevelStatement
   DOMAIN: sql.SybaseSelectStatement
    DOMAIN: sql.QueryExpression
     DOMAIN: sql.NonJoinQueryExpression
      DOMAIN: sql.NonJoinQueryPrimary
       DOMAIN: sql.SimpleTable
        DOMAIN: sql.SybaseQuerySpecification
         DOMAIN: sql.SelectList
          DOMAIN: sql.SelectSublist
           DOMAIN: sql.DerivedColumn
            DOMAIN: sql.ValueExpression
             DOMAIN: sql.ValueTerm
              DOMAIN: sql.ValueFactor
               DOMAIN: sql.ValuePrimary
                DOMAIN: sql.ColumnReference
                 DOMAIN: sql.ColumnName
              DOMAIN: sql.Operator
              DOMAIN: sql.ValueFactor
               DOMAIN: sql.ValuePrimary
                DOMAIN: sql.UnsignedValueSpecification
                 DOMAIN: sql.UnsignedLiteral
                  DOMAIN: sql.UnsignedNumericLiteral
         DOMAIN: sql.TableExpression
          DOMAIN: sql.FromClause
           DOMAIN: sql.TableReferenceList
            DOMAIN: sql.Tables
             DOMAIN: sql.TableName
              DOMAIN: sql.QualifiedTable Name
```

RULE CONSTRUCTION AND APPLICATION

TECHNICAL FIELD

This invention relates to artificial intelligence, and more particularly, to the construction of complex rules in an efficient and organized manner, wherein such constructed rules may be utilized or stored for later application.

BACKGROUND OF THE INVENTION

Rules based systems have become prevalent over the past several years as a technique of managing complex business database and logistical systems. U.S. Pat. Nos. 5,875,440 and 5,899,991 (the '440 and the '991 patents, respectively) are examples of rules based systems used in database management. Additionally, U.S. patent application Ser. No. 09/338,994 now U.S. Pat. No. 6,442,537 describes a technique of constructing rules from templates based upon an induction process.

The automatic construction of rules, while known in the art, is typically not very efficient. Additionally, a structured technique of constructing rules from a known database would allow such systems to be implemented generically and then easily adapted to govern access to databases. Additionally, such a technique could extend into any area of rules based systems.

It is also desirable to allow for rules that are constructed using automated means to be utilized to construct other rules. Such a scenario permits recursive rule construction. It also permits flexibility in that it allows the automatic rules to be changed and updated as the environment changes.

SUMMARY OF THE INVENTION

The above and other problems of the prior art are overcome in accordance with the present invention which relates to a technique of systematically and efficiently constructing complex rules from atomic rules, other complex rules and/or template rules. In accordance with the invention, a database of rules is maintained and fed as needed into a rule constructor, which performs the appropriate processing and generates complex rules based thereon. The complex rules may then be stored or applied to particular objects. The rules may be constructed using template rules which are completed using specific atomic rules so that customized atomic or complex rules are constructed.

In order to assist in applying the complex rules to objects, a domain agent is defined which matches rules to objects upon which such rules should operate. The domain agent allows the rules to be independent of the objects upon which they are operating.

BRIEF DESCRIPTION OF THE DRAWINGS

FIG. 3 depicts a problem domain hierarchy for the given SQL statement.

DETAILED DESCRIPTION OF THE PREFERRED EMBODIMENT

Figure 1:
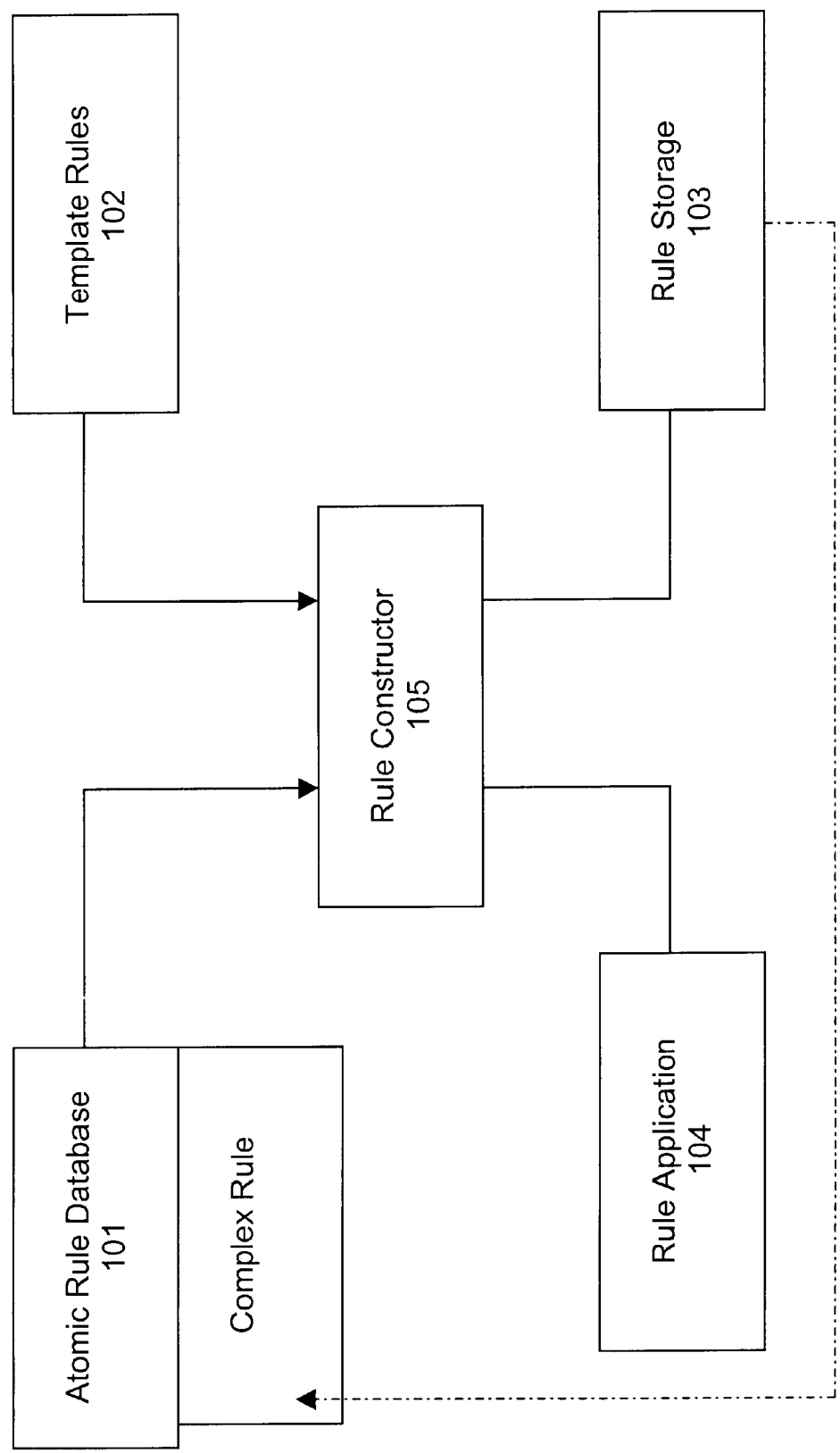
FIG. 1 shows a high level conceptual diagram of the present invention.

FIG. 1 depicts a high level block diagram of the functions required to implement the teachings of the present invention. The arrangement of FIG. 1 includes a rule constructor 105, arranged to accept as its inputs a set of atomic rules 101. The arrangement of FIG. 1 also includes a set of outputs from the rule constructor 105, those outputs being either an application of the rules that are output or a nonvolatile storage facility such as a database.

For exemplary purposes herein, the system of FIG. 1 is intended to be a database access system, also known as a query management system, which controls access to large databases of records and tables. The system is intended to operate as a filter on such queries and determine which queries are allowed and which are not, as described in the aforementioned '991 and '440 patents.

A sample set of problem domains for use in constructing a set of query management complex rules is depicted in FIG. 3. Within each domain a separate domain agent will be defined for each atomic rule written to it. The rules that may be allowed within each domain may be restricted, as described in the '991 and '440 patent, in order to allow for efficient firing of such rules and to make the entire system flexible and modular.

In operation, a textual database of atomic rules is stored at 101. The atomic rules may be utilized by the rule constructor without the template rules. The rule constructor include an induction engine which examines queries and constructs appropriate rules by monitoring the results of such queries. The rule constructor may construct such rules by picking and choosing the appropriate atomic rules from the atomic rules database 101 as appropriate.

The rule constructor 105 determines that a particular complex rule is required. That determination is made through an induction process the particular details of which may vary among systems but which is known to those in the art. Additionally, the use of induction for the construction of rules is known to those of skill in the art.

The rule constructor then selects the appropriate atomic rules from an atomic rule database 101 and constructs the required rule using induction techniques. Virtually all rules to be constructed can be built from the atomic rules stored at 101. The complex constructed rule may be forwarded to rule storage 103 or may be utilized immediately by rule applicator 104 which fires the rules on an appropriate object.

In an enhanced embodiment, template rules 102 may be used in conjunction with the atomic rules 101 in order to derive the complex rules. The use and storage of template rules is discussed in detail in copending application Ser. No. 09/338,994 now U.S. Pat. No. 6,442,537. By utilizing both the template rules and the atomic rules, the rule constructor 105 can manufacture nearly any rule it needs by simply completing the missing portions of the template rules necessary to make the template rule operative with one or more atomic rules.

In another embodiment, the rule storage 103 may be fed back to atomic rules database 101 and utilized instead of atomic rules. An atomic rule can initially be used to generate a complex rule that consists of two atomic rules. That complex rule may then be fed back as shown in FIG. 1 to rules database 101, wherein it may be recycled through the rule constructor to generate an even more complex rule.

In another embodiment the rules constructed in 105 may be rules about constructing new rules. This allows for recursive rule generation.

Figure 2:
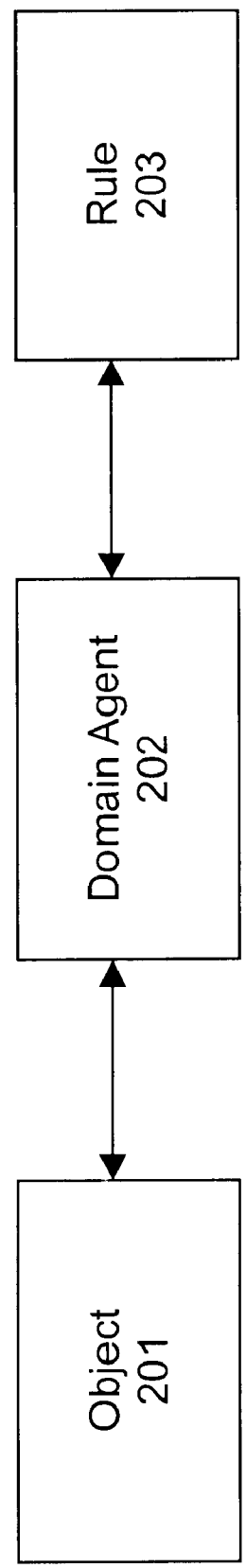
FIG. 2 shows the interrelationship between the domain agent of the present invention and a rule and object upon which that rule will operate.

FIG. 2 shows a domain agent 202 arranged to bidirectionally communicate with both object 201 and rule 203. The rule 203 is constructed to be directed at a particular object upon which it will operate. When the object is a database query, a particular query arrives that requires a certain rule, the domain agent will determine from the object what rule is required and will fire the appropriate rule. The rule need not keep track of the particular object upon which it is operating.

We now describe one specific hypothetical example with respect to query management. Consider a set of atomic rules for governing a database query system, three of such rules being as follows: (1) select clause="*"; (2) from clause="table x"; and (3) cancel query. The rule constructor 105, which contains the induction engine, would have the ability to determine that queries seeking to select everything (i.e.; the "*" in the SQL terminology) from a table X should be canceled. When that determination was made, the appropriate atomic rules are gathered by the rule constructor, and the three cited atomic rules are combined to form a complex rule that may then be stored or applied and discarded. That complex rule could be fed back to be used in generating a further rule, such as all queries that select all entries from a table X are canceled only upon some other condition being met, where the other condition is determined by the induction process within rule constructor 105.

The above describes the preferred embodiment of the invention. It is understood that various other modifications and variations will be apparent to those of skill in the art, and that such modifications are intended to be covered by the following claims.

What is claimed:

1. A method of constructing rules for use in examining queries in a database query management system comprising:

storing a set of atomic rules in a database;

determining a complex rule to be constructed by utilizing an automated process;

constructing the determined complex rule from said atomic rules in said database wherein said atomic rules and said complex rules being operable on queries in said database query management system and said constructed complex rule is different from said atomic rules from which it is constructed;

defining a domain agent; and utilizing said domain agent to interface between said complex rule and an object upon which said complex rule operates.

2. The method of claim 1 wherein said complex rule is utilized with other atomic rules to construct a second complex rule.

3. The method of claim 2 wherein said complex rule is utilized immediately after being constructed to operate on an object.

4. The method of claim 2 wherein said complex rule is stored after being constructed for later use.

5. The method of claim 1 wherein said step of constructing further includes the step of combining atomic rules with template rules.

6. The method of claim 5 wherein said template rules are updated periodically.

7. The method of claim 1 where the automated process is an induction process.

8. The method of claim 1 wherein said complex rule is a rule about constructing new rules.

9. The method of claim 1 wherein said complex rule is utilized with other atomic rules to construct a second complex rule.

* * * * *